United States Patent
Sutcliffe et al.

(10) Patent No.: US 10,533,592 B2
(45) Date of Patent: Jan. 14, 2020

(54) FLUSH-MOUNT, ARTICLE-RETAINING FASTENER

(71) Applicant: Penn Engineering & Manufacturing Corp., Danboro, PA (US)

(72) Inventors: James R Sutcliffe, Warminster, PA (US); Jennifer Lake, Philadelphia, PA (US); Brian Bentrim, Furlong, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 244 days.

(21) Appl. No.: 15/255,636

(22) Filed: Sep. 2, 2016

(65) Prior Publication Data

US 2017/0067496 A1 Mar. 9, 2017

Related U.S. Application Data

(60) Provisional application No. 62/214,037, filed on Sep. 3, 2015.

(51) Int. Cl.
*F16B 17/00* (2006.01)
*F16M 13/02* (2006.01)

(52) U.S. Cl.
CPC ............. *F16B 17/00* (2013.01); *F16M 13/02* (2013.01)

(58) Field of Classification Search
CPC ............ F16B 17/002; F16B 2001/0035; F16B 21/088; F16M 11/041; F16M 13/02; F16M 13/022; Y10T 403/7039; Y10T 24/44026

(Continued)

(56) References Cited

U.S. PATENT DOCUMENTS 3,009,225 A 11/1961 Budreck
3,871,264 A * 3/1975 Hallock ............... F16B 15/00
29/432

(Continued)

FOREIGN PATENT DOCUMENTS

GB 2063343 6/1979
WO 99/42234 A1 8/1999
WO 2013/029049 A2 2/2013

OTHER PUBLICATIONS

PCT International Search Report and the Written Opinion of the international Searching Authority, PCT/US/16/50116, dated Feb. 6, 2017.

(Continued)

*Primary Examiner* — Victor D Batson
*Assistant Examiner* — Matthew J Sullivan
(74) *Attorney, Agent, or Firm* — Gregory J. Gore, Esq.

(57) ABSTRACT

A clinching or swaging fastener for securely mounting a secondary article, such as a magnet, flush to a surrounding surface. An interference fit fastening feature holds the secondary article flush by using a deformable center knob on the end wall at the bottom of the retainer. Alignment features on the outer portion of the retainer body can fixture the magnet in a desired orientation. A radial flange surrounds the mouth of the bore which has a peripheral lip that extends upwardly. Clinch attachment means comprising a circular peripheral undercut is located on the outside of the body just below the flange for attaching the body to a host object. The article may have a peripheral chamfer at the top which receives the lip as it is deformed against the article to provide a flush alignment to the host object.

20 Claims, 3 Drawing Sheets

(58) Field of Classification Search
USPC .................................. 29/469.5, 505, 515
See application file for complete search history.

(56) References Cited

U.S. PATENT DOCUMENTS

| | | | | |
|---|---|---|---|---|
| 4,231,137 | A | 11/1980 | Toshio | |
| 4,265,002 | A | 5/1981 | Hosken | |
| 4,722,619 | A * | 2/1988 | Reiser | B41F 13/20 |
| | | | | 29/509 |
| 5,983,464 | A | 11/1999 | Bauer | |
| 6,164,168 | A | 12/2000 | Anderson | |
| 6,427,555 | B2 * | 8/2002 | Mack | B23B 31/1071 |
| | | | | 279/152 |
| 7,082,650 | B2 * | 8/2006 | Awakura | F16B 5/0642 |
| | | | | 24/458 |
| 8,464,377 | B1 | 6/2013 | Carson et al. | |
| 9,211,605 | B2 * | 12/2015 | Beenken | B21D 39/03 |
| 9,243,655 | B2 * | 1/2016 | Morris | F16B 17/002 |
| 9,371,851 | B2 * | 6/2016 | Szuba | F16B 17/002 |
| 2002/0187000 | A1 * | 12/2002 | Heier | B21C 37/108 |
| | | | | 403/282 |
| 2010/0101492 | A1 | 4/2010 | Sarajian et al. | |
| 2013/0328744 | A1 * | 12/2013 | Frohler | B21D 39/031 |
| | | | | 343/878 |
| 2015/0086265 | A1 * | 3/2015 | Morris | F16B 17/002 |
| | | | | 403/280 |
| 2016/0341234 | A1 * | 11/2016 | Germann | B29C 65/08 |

OTHER PUBLICATIONS

European Supplementary Search Report, dated Apr. 11, 2019.

* cited by examiner

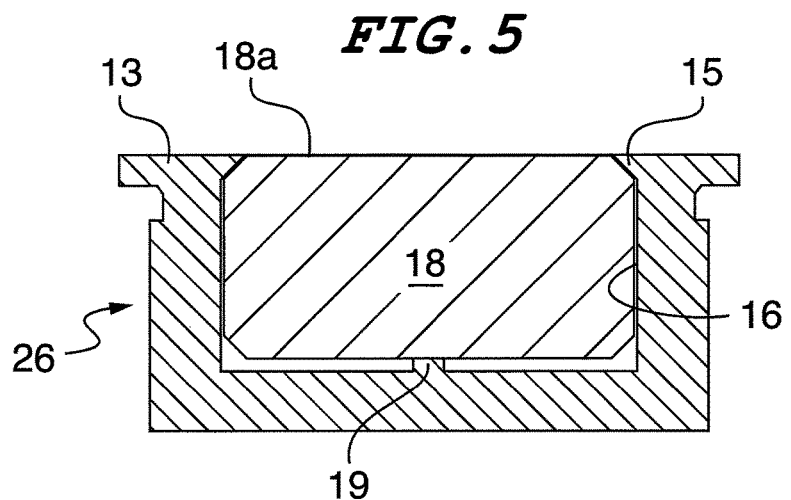
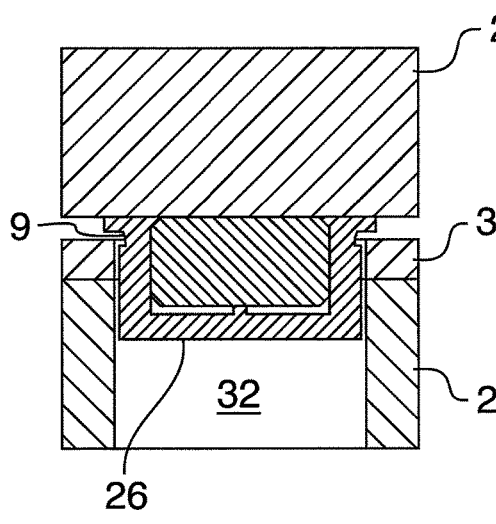
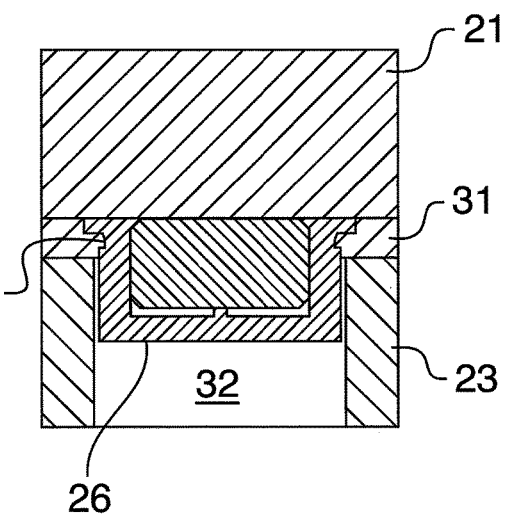

FLUSH-MOUNT, ARTICLE-RETAINING FASTENER

RELATED APPLICATIONS

This is a non-provisional patent application of U.S. provisional patent application No. 62/214,037 entitled "Flush-Mount Article-Retaining Fastener", filed Sep. 3, 2015, priority from which is hereby claimed.

FIELD OF THE INVENTION

The invention relates to fasteners for more securely fixing an article, such as a magnet, to a host object so that the active surface of the article is flush with the surface of the host object.

BACKGROUND OF THE INVENTION

Adhesive are the most common means used to hold magnets in place on a host object. However, adhesives have several drawbacks. For example, the attachment strength between the magnet and host object is only as strong as the adhesive bond between the two. Similarly, if the magnet is plated, as is often the case, the attachment strength is only as strong as the adhesive bond between the plate and the host object. Therefore, it would be desirable to provide a connection mechanism between a magnet and a host object that is stronger than adhesives.

Unlike other items made of deformable metal, magnets are difficult to attach to a host object without a mechanical fastener because they cannot be shaped, for example, to include a clinch undercut to enable the magnet to be clinch fastened to a host object. Magnets are also too week to handle the installation force of a clinch process. In the prior, magnets are affixed to a host object using various mechanical fasteners. It is well known that the magnetic field, and hence magnetic connection, between a magnet and its target is inversely proportional to the distance between the magnet and the target. Many prior art magnet fasteners arrange the connection surface of the magnet countersunk relative to the active surface of the host target, thereby creating an undesirable gap between the magnet and the complementing connection surface on the target. This gap weakens the connection force between the host and the target. Therefore, it is also desirable to provide a connection mechanism that positions the magnet's connection surface flush with the active surface of a host object.

SUMMARY OF THE INVENTION

The article-retaining fastener of the present invention is a clinching or swaging fastener that can hold a secondary article, such as a magnet, flush to a surrounding surface. A closing feature holds the secondary article flush by using a center knob in the bore at the bottom of the retainer. In addition to the knob, the secondary article can also be held with an adhesive. Alignment features on the outer portion of the fastener will fixture the magnet in some orientation if necessary. If the part is correlated or is asymmetrical, the part can be aligned in the same orientation during assembly. This ensures that the secondary article is always aligned in the same orientation during assembly and installation in the host object.

More specifically, the article-retaining fastener of a preferred embodiment includes a body having a top, a bottom and a central axis. An axial bore extends from a mouth at the top of the body downward to a transverse end wall at the bottom of the body. A radial flange surrounds the mouth of the bore, which has a peripheral lip that extends upwardly. At least one upwardly-projecting knob is located on the end wall such that an article is rigidly held between the lip and the knob after they are simultaneously deformed against opposite ends of the article. Clinch attachment means comprising an undercut are located on the outside of the body just below the flange for attachment of the body to a host object. In one preferred embodiment of the invention, the secondary article is a magnet that has a peripheral chamfer at the top, which receives the lip as it is deformed against the magnet to provide a flush alignment between the operating surface of the magnet, the deformed lip and the flange.

Other advantages will follow from the foregoing explanation and the following description of the invention. The preferred embodiment of the invention will provide one of skill in the art with a full understanding of what has been invented.

BRIEF DESCRIPTION OF THE DRAWINGS

FIG. 5 is a cross section of an article and fastener assembly in accordance with another embodiment of the invention; and, FIGS. 6 and 7 are sequential cross sections illustrating a method of installing the fastener assembly of FIG. 5 to a host object.

DETAILED DESCRIPTION OF THE PREFERRED EMBODIMENTS

Figure 1:
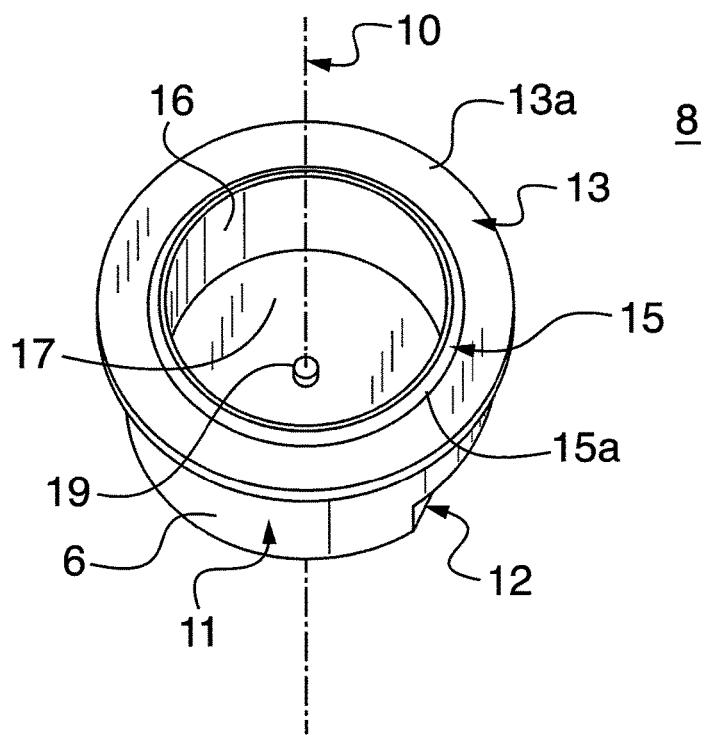
FIG. 1 is a top perspective of a flush-mount, article-retaining fastener in accordance with a preferred embodiment of the invention.
Figure 2:
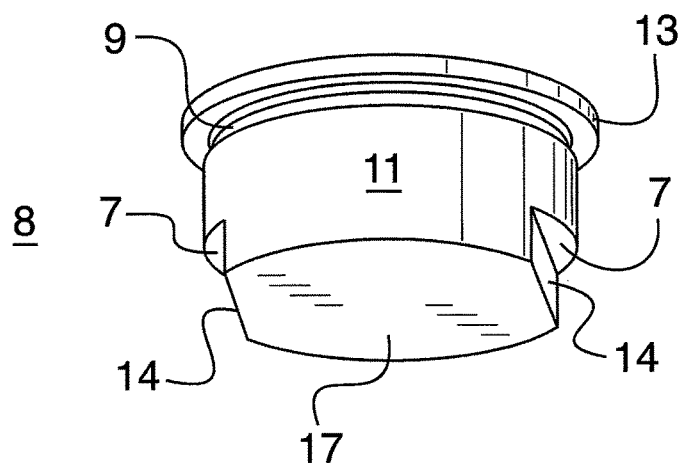
FIG. 2 is a bottom perspective of the fastener of FIG. 1.

A flush-mount, article-retaining fastener in accordance with a preferred embodiment is shown in FIGS. 1 and 2 and is designated generally by reference numeral 8. The fastener 8 generally comprises a main body 11 having a central bore 16 and central vertical axis 10. The body 11 has a substantially-cylindrical shape, axially-extending side walls 6, and a transversely-extending bottom end wall 17. The central bore 16 is cylindrical and is defined by the inner surfaces of the side walls 6 and the transverse end wall 17. The main body may include host alignment means 12. Other preferred embodiments do not include the alignment means 12.

In the embodiment shown in FIGS. 1-7, the host alignment means 12 comprises two voids formed in opposite sides of the outer surface of the bottom portion of the side walls 6 proximate the transverse end wall 17. Each void has an outward, radially-facing, planar surface 14 and an axially-facing, planar surface 7. The radially-facing surfaces 14 are parallel and extend generally transverse to the plane of the transverse end wall 17. The axially-facing surfaces are co-planar and extend generally parallel to the plane of the transverse end wall 17. In addition to positioning the fastener 8 within a host object, the alignment means 12 provide grip points for a work tool for secure handling of the fastener 8 when a strong magnet is retained in the bore.

The top of the body 11 has a radially-extending flange 13 having an inner periphery 13b that is continuous with and has the same diameter as the inner surface of the side walls 6. The flange also has an outer periphery 13c having a diameter larger than the outer surface diameter of the side walls 6. The flange 13 includes a peripheral lip 15 that extends axially upwardly from the inner periphery 13b of the flange 13 and the mouth of the bore 16. The body also includes a peripheral clinch undercut 9 in the outer surface of the side walls 6 underneath the flange 13.

In a preferred embodiment, the lip 15 has an outer surface 15a that tapers inwardly in the upward direction and has a triangular cross section. As described below, the cross section of the lip approximates the volume of the void 24 between the inner periphery 13b of the flange 13 and the chamfer 22 on the article (described below).

Figure 4:
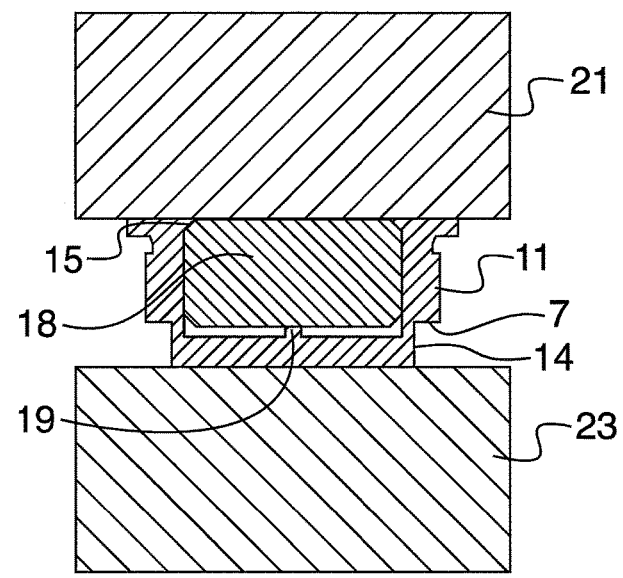

The transverse end wall 17 includes at least one knob 19 that projects axially upwardly within the bore 16. In a preferred embodiment, the knob 19 comprises a cylindrical protrusion that is integrally formed with the transverse end wall 17. However, the knob 19 can have any shape so long as the deformation is controlled during the assembly process. The knob 19 functions as a deformable, clearance take-up element that ensures an interference fit of the retained article 18 between the lip 15 and the knob 19 after installation as shown in FIG. 4. The knob 19 compensates for tolerance variations and ensures that the upper surface 18a, which is usually the active surface, of the retained article 18 is perfectly flush with the upper surface 13a of the flange 13 when the article 18 is mounted within the fastener 8.

Figure 3:
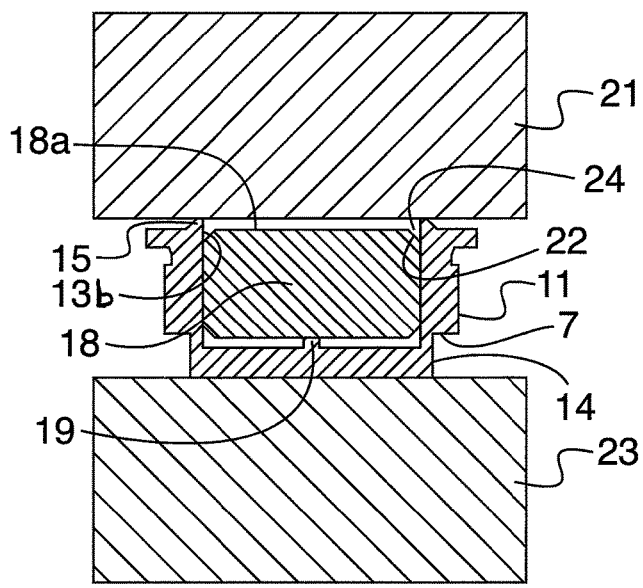
FIGS. 3 and 4 are sequential cross sections of an article and fastener assembly on a press, which illustrate a method of assembling an article within the fastener of FIG. 1 in accordance with a preferred embodiment of the invention.

A method of assembling an article 18 such as a magnet within the fastener 8 of FIGS. 1 and 2 in accordance with a preferred embodiment of the invention is sequentially illustrated in FIGS. 3 and 4. In one preferred embodiment, the article 18 preferably has a shape that complements the shape of the bore 16 and has a chamfer 22 around its top periphery. The chamfer 22 is located proximate the inner periphery 13b of the lip 13. As described above, the chamfer 22 creates a radial void 24 that receives the lip 15 when the lip 15 is deformed downwardly and inwardly by a press.

Referring to FIG. 3, the article 18 is initially inserted in the bore 16 and seated against the knob 19. The length (axial dimension) of the article 18 and the knob 19 are selected so that the upper surface 18a of the article 18 is either flush with or above the upper surface 13a of the flange 13 prior to pressing. Next, the loose assembly (fastener and article) is located between a press punch 21 and an anvil 23. When the press is activated, the punch 21 first contacts the lip 15 and deforms it inwardly and downwardly into the void 24. The taper of the outer surface 15a of the lip 15 enables the inward folding of the lip 15 by the press punch. Also, the taper of the outer surface 15a of the lip 15 reduces its volume and reduces the press force necessary to deform it into the void 24. A reduced press force is more easily controlled and reduces damage to the article 18 and fastener 8.

Referring to FIG. 4, the press stops at a limit position when the lip 15 is collapsed around the chamfer 22 of the article 18 and the press contacts the upper surface 13a of the flange. During the assembly process, the knob 19 is also deformed by the downward force of the lip 15 pressing on the article 18. Deformation of the knob and the lip creates an interference fit between the knob 19 and the lip 15. When the press reaches the limit position, the upward force of the knob 19 ensures that the article is always flush in all tolerance conditions after assembly. The interference fit also causes the article 18 to resist rotation for applications that require a fixed, non-rotatable article. Once the assembly process is finished, the article 18 and fastener 8 comprise a completed fastener assembly 26.

A fastener assembly 26 without the optional alignment means 12 is shown in isolation in FIG. 5. Using the assembly process described above, the article 18 is wholly captured within the bore 16 and is rigidly held between the deformed lip 15 and the deformed knob 19. As a result, the active top surface 18a of the article 18 lies flush with the deformed tapered surface 15a of the lip 15 and the upper surface 13a of the flange 13.

A method of installing a fastener assembly 26 to a host object 31 in accordance with a preferred embodiment of the invention is sequentially illustrated in FIGS. 6-7. In one preferred embodiment, the host object is a sheet of metal such as aluminum. Referring to FIG. 6, the fastener assembly 26 is initially installed in a hole 32 in the host object 31. Next, the assembly 26 is located between a press punch 21 and an anvil 23. When the press is activated, the punch 21 urges the assembly 26 downwardly and the undercut into the hole 32. Because the diameter of the flange 13 is larger than the hole 32, the flange displaces host material downwardly and radially-inwardly into the undercut 9. The displaced host material provides positive interlocking of the fastener assembly 26 to the host object 31.

The foregoing is to be considered illustrative only of the principles and possible embodiments of the invention. Further, since numerous modifications and changes will readily occur to those skilled in the art, it is not desired to limit the invention to the exact construction and operation shown and described. Accordingly, suitable modifications and equivalents may be resorted to, all falling within the scope of the invention which shall be determined only by the following claims and their legal equivalents.

The invention claimed is:
1. A fastener, comprising:
   a cylindrical body having a top, a bottom and a central vertical axis;
   a vertical axial bore adapted to hold an article and extending from a mouth at the top of the body downward to
   an end wall of the bore at the bottom of the body transverse to the vertical axis;
   a radial flange at the top of the body surrounding the mouth of the bore;
   a deformable peripheral lip extending upwardly from the bore mouth; and
   at least one upwardly-projecting deformable knob means located on the end wall of the body for holding-an article within the bore rigidly held between the lip and said knob after they are simultaneously deformed against opposite ends of the article.
2. The fastener of claim 1 in its free state further including attachment means located on the outside sidewalls of the body directly below the flange.
3. The fastener of claim 1 wherein an outside surface of the lip is inwardly tapered in the upward direction.
4. The fastener of claim 2 wherein the attachment means is a circular peripheral undercut in the sidewalls for receiving the cold flow of material from a host object.
5. The fastener of claim 4 further including alignment means for radially aligning the body with a host object on the outer surface of the bottom portion of the body side walls.
6. An assembly, comprising:
   a retainer comprising;
      a cylindrical body having a top, a bottom and a central vertical axis;

an axial bore extending from a mouth at the top of the body downward to a transverse end wall of the bore at the bottom of the body;

a radial flange at the top of the body surrounding the mouth of the bore;

a deformable peripheral lip extending inwardly from the bore mouth;

at least one upwardly projecting deformable knob located on the bore end wall of the body; and, an article rigidly held between the lip and said knob.

7. The assembly of claim 6 wherein the lip and the knob are adapted to be simultaneously deformed against opposite top and bottom sides of the article as opposite ends of the retainer are pressed against it.

8. The assembly of claim 7 wherein the article has a peripheral chamfer that receives the deformed lip of approximately volume equal to the chamfer such that an operative surface of the article lies flush with the flange and the lip after the lip is deformed against the article.

9. The assembly of claim 8 wherein the article is a magnet.

10. The assembly of claim 7 wherein the article is rigidly held within the retainer only by capture between the lip and the knob.

11. The assembly of claim 10 wherein the article lies entirely flush with the top of the cylindrical body without any gaps between them.

12. The assembly of claim 11 further including attachment means located on the outside of the body.

13. The assembly of claim 12 wherein the attachment means is located directly below the flange.

14. The assembly of claim 13 further including a host object with a hole into which the retainer is mounted.

15. The assembly of claim 14 wherein the attachment means is a circular peripheral undercut in the outer sidewalls of the body for receiving the cold flow of material from the host object which mechanically interlocks the retainer to the host object.

16. The assembly of claim 15 wherein the host object is composed of metal.

17. The assembly of claim 16 wherein the host object is a sheet of aluminum.

18. The fastener of claim 5 wherein the alignment means comprises at least one void at the bottom of the retainer body.

19. The fastener of claim 18 wherein the alignment means comprises at least one outward facing planar surface of the retainer body side wall.

20. The fastener of claim 19 wherein the alignment means comprises two outward facing parallel planar surfaces located on opposite sides of the retainer at the bottom most end of the retainer.

* * * * *